United States Patent
Forssen et al.

(10) Patent No.: US 12,046,423 B2
(45) Date of Patent: Jul. 23, 2024

(54) WOUND ELECTRICAL COMPONENT WITH LAYERS OF A HIGH PERMITTIVITY MATERIAL

(71) Applicant: HITACHI ENERGY LTD, Zürich (CH)

(72) Inventors: Cecilia Forssen, Västerås (SE); Harald Martini, Gothenburg (SE); Joachim Schiessling, Enköping (SE); Nils Lavesson, Västerås (SE); Peter Dyreklev, Norrköping (SE); Mats Sandberg, Norrköping (SE)

(73) Assignee: HITACHI ENERGY LTD, Zürich (CH)

( * ) Notice: Subject to any disclaimer, the term of this patent is extended or adjusted under 35 U.S.C. 154(b) by 847 days.

(21) Appl. No.: 15/734,436

(22) PCT Filed: May 29, 2019

(86) PCT No.: PCT/EP2019/064075
§ 371 (c)(1),
(2) Date: Dec. 2, 2020

(87) PCT Pub. No.: WO2019/229176
PCT Pub. Date: Dec. 5, 2019

(65) Prior Publication Data
US 2021/0225595 A1     Jul. 22, 2021

(30) Foreign Application Priority Data
Jun. 1, 2018   (EP) ..................................... 18175606

(51) Int. Cl.
*H01G 4/32* (2006.01)
*H01B 17/28* (2006.01)
(Continued)

(52) U.S. Cl.
CPC ............... *H01G 4/32* (2013.01); *H01B 17/28* (2013.01); *H01B 17/42* (2013.01); *H02G 15/072* (2013.01)

(58) Field of Classification Search
None
See application file for complete search history.

(56) References Cited

U.S. PATENT DOCUMENTS

| 4,320,437 | A | 3/1982 | Shaw et al. |
| 4,847,450 | A | 7/1989 | Rupprecht |

(Continued)

FOREIGN PATENT DOCUMENTS

| BR | 112015013657 A2 | 7/2017 |
| CN | 105144308 A | 12/2015 |

(Continued)

OTHER PUBLICATIONS

Search Report, Chinese Patent Application No. 2019800352302, mailed Nov. 30, 2021, 3 pages.
(Continued)

*Primary Examiner* — Eric W Thomas
(74) *Attorney, Agent, or Firm* — Sage Patent Group

(57) ABSTRACT

The present disclosure relates to a wound electrical component comprising a wound body comprising a plurality of wound layers of a web of an electrically insulating material around a longitudinal axis of the body. The wound body comprises a plurality of electrically conducting layers of an electrically conducting material, each printed onto a respective separate area of the web in the wound body. An edge zone of at least one of the plurality of electrically conducting layers is connected to a printed high permittivity layer of a high permittivity material along said edge zone such that at least a part of the high permittivity layer extends, printed on the web, beyond the edge zone.

19 Claims, 3 Drawing Sheets

(51) Int. Cl.
*H01B 17/42* (2006.01)
*H02G 15/072* (2006.01)

(56) References Cited

U.S. PATENT DOCUMENTS

| | | |
|---|---|---|
| 2003/0075777 A1 | 4/2003 | Carlen et al. |
| 2004/0102092 A1* | 5/2004 | Jazowski ........... H01R 13/5205 |
| | | 439/606 |
| 2005/0208808 A1* | 9/2005 | Jazowski ............... H01R 13/53 |
| | | 439/181 |
| 2008/0179077 A1 | 7/2008 | Krivda et al. |
| 2013/0025911 A1 | 1/2013 | Borjesson et al. |
| 2014/0110151 A1 | 4/2014 | Johansson et al. |
| 2015/0325341 A1 | 11/2015 | Hedlund et al. |

FOREIGN PATENT DOCUMENTS

| | | | |
|---|---|---|---|
| CN | 105308688 A | 2/2016 | |
| EP | 2375423 A1 | 10/2011 | |
| EP | 2911255 A1 | 8/2015 | |
| EP | 3358573 A1 | 8/2018 | |
| EP | 3531431 A1 | 8/2019 | |
| EP | 3660869 A1 * | 6/2020 | ............ H01B 17/28 |
| WO | 2012000985 A1 | 1/2012 | |
| WO | 2014206435 A1 | 12/2014 | |

OTHER PUBLICATIONS

International Search Report and Written Opinion for International Application No. PCT/EP2019/064075 dated Jun. 26, 2019.

* cited by examiner

WOUND ELECTRICAL COMPONENT WITH LAYERS OF A HIGH PERMITTIVITY MATERIAL

CROSS REFERENCE TO RELATED APPLICATIONS

This application is a 35 U.S.C. § 371 national stage application of PCT International Application No. PCT/EP2019/064075 filed on May 29, 2019, which in turns claims foreign priority to EP Patent Application No. 18175606.5, filed on Jun. 1, 2018, the disclosures and content of which are incorporated by reference herein in their entirety.

TECHNICAL FIELD

The present disclosure relates to a wound electrical component comprising layers of an electrically conducting material, and to a method of forming a wound body thereof.

BACKGROUND

Thin conductive layers within electrical insulation play an important role in a number of high voltage (HV) products, e.g. capacitors, cable terminations, bushings, current transformers, etc. At the edges of such a layer, due to its geometry, the electric field gets enhanced. This inhomogeneous field is much larger than the homogeneous field in other regions of electrical insulation and is very often the dimensioning factor for the design of the electrical insulation.

Conventionally, aluminium foils interleaved between layers of electrical insulation are used as conductive layers. Resistive field-grading material (FGM) tapes, typically having a thickness of about 300 µm, may be used at the edges of the foils to modify the electrical field, but results in high losses.

EP 2 375 423 relates to a condenser body of a bushing in which floating conducting foils are provided with a field-grading material (FGM) extending past the edge of the foil.

WO 2014/206435 relates to the use of reduced graphene oxide as a field-grading material in e.g. bushings.

U.S. Pat. No. 4,320,437 relates to a roll section for an electrical capacitor which comprises a wound composite of alternate strips of polypropylene and aluminium foil with narrow bands of a dielectric coating along the longitudinal edges of the aluminium strips.

Alternatively to the use of foils, the conductive layers may be printed onto a film of insulation material.

EP 2 911 255 relates to a high voltage lead-through device comprising a conductor, and a non-impregnable film wound around the conductor thus forming a condenser core. The non-impregnable film has a surface comprising a plurality of regions provided with a conductive compound, e.g. a conductive ink, wherein each region provided with the conductive compound forms a respective conductive layer of the condenser core.

SUMMARY

To use printing techniques to apply the electrically conducting material of the floating electrodes (herein called electrically conducting layers), instead of foils, is advantageous, e.g. to avoid slippage between the electrically conducting layers and the web (could also be called a film) of insulation material wound around a conductor. Also, the electrically conducting layers can be made thinner, thus taking up less space in the wound body, than if a foil is used.

However, the printing process when applying the electrically conducting layers may give rise to defects at the edges of the electrically conducting layers, and conducting particles (e.g. of a conducting ink used for the electrically conducting layers) may end up outside of the printed area at said edges. Further, since printed electrically conducting layers are generally thinner than conventionally used foils, the electrical field at the edges are increased further.

It has now been realised that by printing a high permittivity material along, covering and extending beyond, the edges of the electrically conducting layers, these problems may be alleviated. Defects at, and conducting particles beyond, the edges of the electrically conducting layers may thus be encompassed in the high permittivity material, and the increased electrical field at the edges can be modified.

According to an aspect of the present invention, there is provided a wound electrical component comprising a wound body comprising a plurality of wound layers of a web of an electrically insulating material around a longitudinal axis of the body. The wound body comprises a plurality of electrically conducting layers of an electrically conducting material, each printed onto a respective separate area of the web in the wound body. An edge zone of at least one of the plurality of electrically conducting layers is connected to a printed high permittivity layer of a high permittivity material along said edge zone such that at least a part of the high permittivity layer extends, printed on the web, beyond the edge zone.

In some embodiments, the wound electrical component is or comprises a bushing, e.g. a transformer bushing, a capacitor, a cable termination or an instrument transformer, preferably a high-voltage (HV) transformer bushing. The wound electrical component may e.g. be configured for HV applications, e.g. having a voltage rating within the range of 52-1100 kV.

According to another aspect of the present invention, there is provided an electrical device, e.g. a power transformer, comprising an embodiment of the wound electrical component of the present disclosure.

According to another aspect of the present invention, there is provided a method of producing a wound body for a wound electrical component. The method comprises providing a web of an electrically insulating material. The method also comprises printing an electrically conducting material onto each of a plurality of separate areas of the web to form a plurality of respective electrically conducting layers covering each of said areas. The method also comprises, along at least one edge zone of at least one of the plurality of electrically conducting layers, printing a high permittivity material to form a high permittivity layer connected with said edge zone such that at least a part of the high permittivity layer extends, printed on the web, beyond the edge zone. The method also comprises winding the web with the printed electrically conducting and high permittivity layers to form the body of wound layers of the web around a longitudinal axis of the body.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
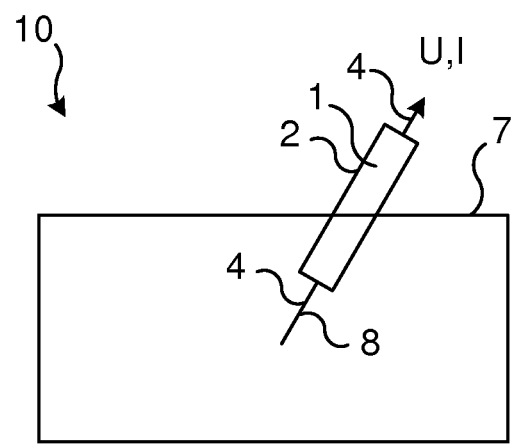
FIG. 1 is a schematic block diagram of an embodiment of an electrical device comprising a wound electrical component, in accordance with the present invention.

FIG. 1 is a schematic side-view in section of an embodiment of an electrical device 10, here in the form of a power transformer comprising a transformer tank and a wound electrical component 1, here in the form of a bushing, passing through a wall 7 of the electrical device 10. The electrical component 1 comprises a wound body 2, e.g. a condenser core, of an electrically insulating material around a longitudinal axis 4 of the body 2 and may be arranged to allow an electrical conductor 8 along the longitudinal axis 4, conducting a current I and voltage U, to pass through the wall 7.

The electrical component 1 may be any electrical device comprising a wound body 2. For instance, the electrical component may be any of a bushing, e.g. transformer bushing, a capacitor, a cable termination or an instrument transformer. Embodiments of the present invention may be especially useful for HV electrical devices 10, e.g. having a voltage rating within the range of 52-1100 kV. Further, the wound electrical component 1 comprised in the electrical device may also have a voltage rating within the range of 52-1100 kV and thus configured for HV applications.

Figure 2:
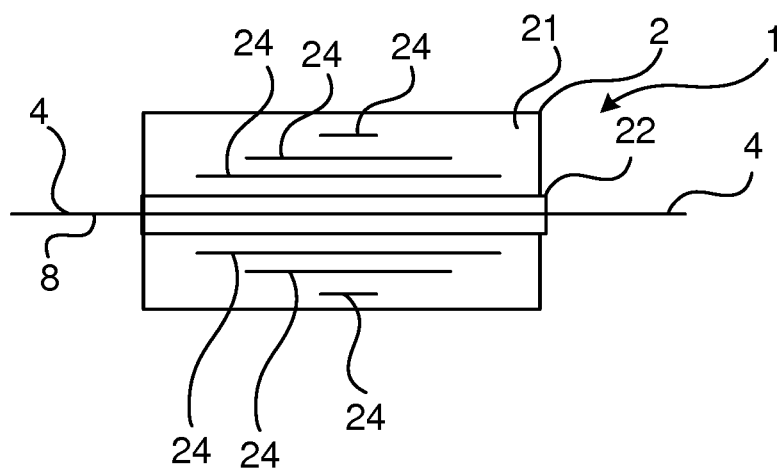
FIG. 2 is a schematic illustration of an embodiment of a wound electrical component, in longitudinal section, in accordance with the present invention.

FIG. 2 illustrates a wound electrical component 1 in longitudinal section, e.g. a bushing as in FIG. 1. The component 1 comprises a wound body 2 of an electrically insulating material 21. A conductor 8, along a central longitudinal axis 4 of the component 1 as well as its wound body 2, passes through a longitudinal through hole provided by a pipe 22 around which a web (e.g. a paper web or thermoplastic film) of the insulating material 21 has been wound to form layers of the wound body 2. At least one, here a plurality of, electrically conducting printed layers 24 are positioned inside of the body 2, printed on layers of the web forming the body, to adjust/control the electrical field of the electrical component 1.

The electrically insulating material 21 may be cellulose based, such as paper based, e.g. as Oil-Impregnated Paper (OIP) or Resin-Impregnated Paper (RIP), preferably epoxy impregnated paper, or the insulating material 21 may be based on a synthetic polymer, e.g. Nomex™ or a thermoplastic polymer material such as polypropylene (PP), polyethylene (PET), polyethylene naphthalate (PEN), polyphenylene sulphide (PPS), polytetrafluoroethylene (PTFE), polyamide (PA), polycarbonate (PC), or polyvinyl butyral (PVB).

Figure 3:
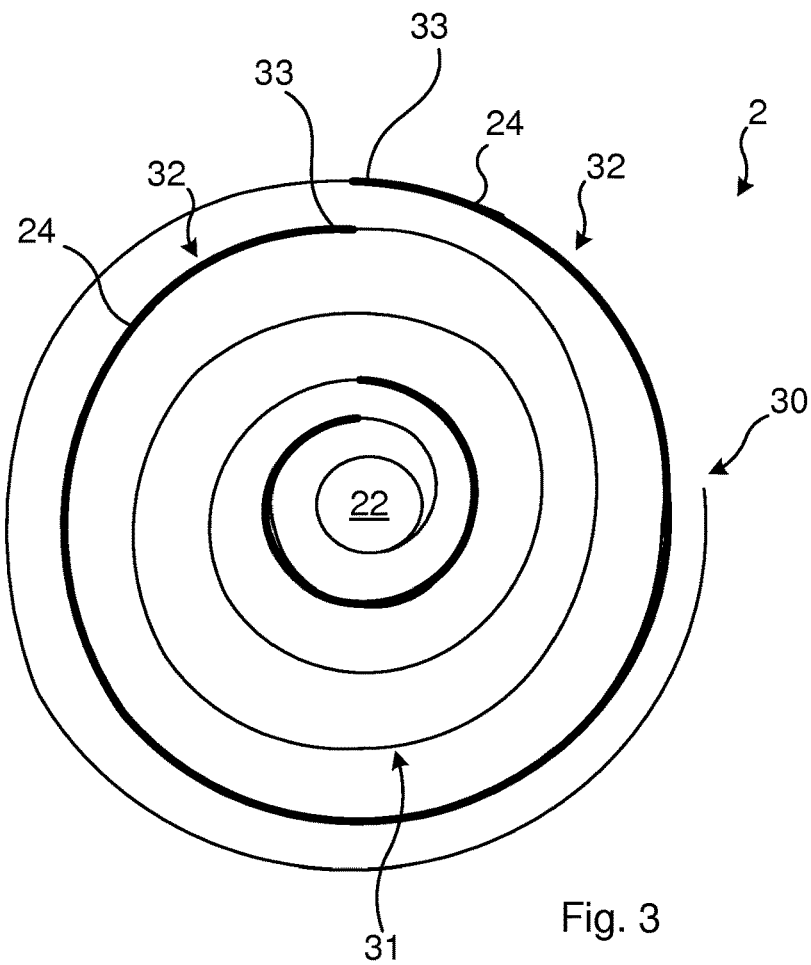
FIG. 3 is a schematic cross-sectional illustration of an embodiment of a wound body of a wound electrical component, in accordance with the present invention.

FIG. 3 is a schematic cross-sectional illustration of an embodiment of a wound body 2 of a wound electrical component 1. A web 30 of an electrically insulating material 21 is wound around a pipe 22, forming wound layers of the body 2 in a spiral manner. Electrically conducting layers 24 are formed on the web 30 by printing on separate areas 32 of the web 30 with an electrically conductive material, e.g. an ink, forming a coated layer of the electrically conductive material on each of said areas 32. Areas of the web 30 outside of the printed areas 32 form a continuous uncoated region 31 of the web 30. The electrically conducting layers 24 each have an edge zone 33 at an edge or end of the electrically conducting layer.

Figure 4:
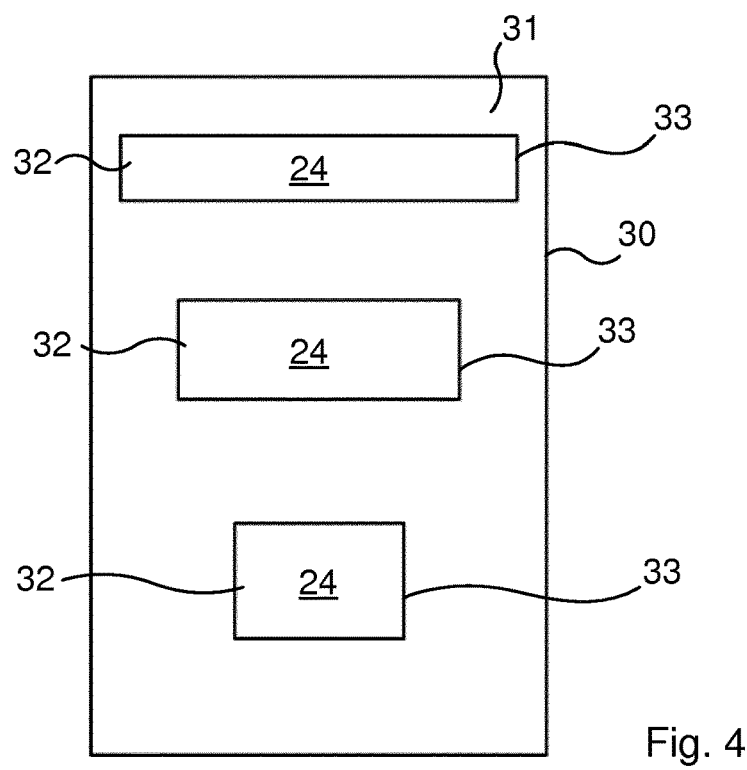
FIG. 4 is a schematic top view of an embodiment of a web with electrically conducting layers printed thereon to cover respective separate surface areas of the web, in accordance with the present invention.

FIG. 4 illustrates an embodiment of the web 30 when rolled-out. A plurality of separate areas 32 are coated by printing with an electrically conducting material to form electrically conducting layers 24 on said areas 32. Areas of the web 30 outside of the printed areas 32 form a continuous uncoated region 31 of the web 30. The electrically conducting layers 24 each have an edge zone 33 at an edge or end of the electrically conducting layer.

Figure 5A:
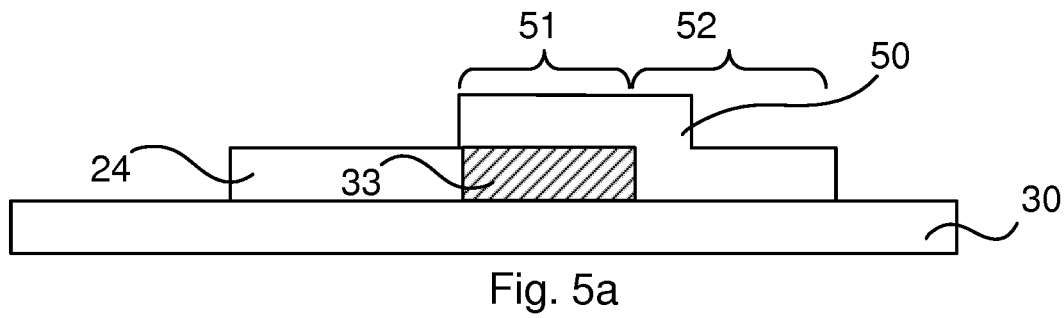
FIG. 5a is a schematic cross-sectional view of an embodiment of a high permittivity layer applied along an edge zone of an electrically conducting layer on a web, in accordance with the present invention.
Figure 5B:
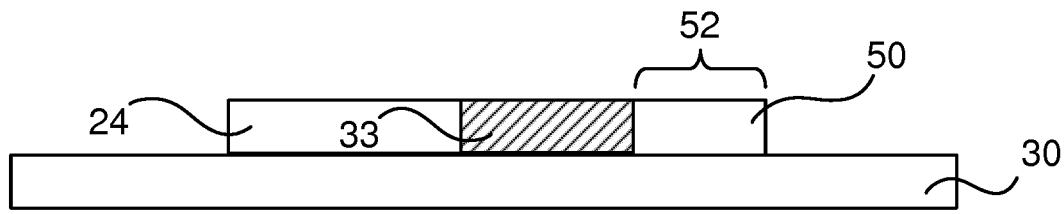
FIG. 5b is a schematic cross-sectional view of an embodiment of a high permittivity layer applied along and integrated with an edge zone of an electrically conducting layer on a web, in accordance with the present invention.

In accordance with the present invention, and with reference to FIGS. 5a and 5b, the edge zone 33 of at least one of the plurality of electrically conducting layers 24 is connected to a printed high permittivity layer 50 of a high permittivity material along said edge zone such that at least a part 52 of the high permittivity layer extends, printed on the web 30, beyond the edge zone (i.e. not overlapping the edge zone).

FIG. 5a illustrates an embodiment of a high permittivity layer 50 applied by printing along an edge zone 33 of an electrically conducting layer 24 on the web 30 of the electrically insulating material 21. In this embodiment, the electrically conducting material is printed partly on the electrically conducting layer 24, overlapping its edge zone 33, to form a part 51 of the high permittivity layer which overlaps the edge zone 33, and partly directly on the web 30, to form a part 52 of the high permittivity layer which extends, printed on the web 30, beyond (not overlapping) the edge zone 33, typically along the whole edge zone.

FIG. 5b illustrates some other embodiments of a high permittivity layer 50 applied by printing along the edge zone 33 of an electrically conducting layer 24 on the web 30. Instead of overlapping the electrically conducting layer 24 (as in FIG. 5a), the high permittivity layer 50 is integrated with the electrically conducting layer 24 at its edge zone. An advantage with this is that there is no increased thickness at the edge zone, formed by an overlapping part 51. An alternative is that the high permittivity layer 50 abuts the electrically conducting layer 24 along its edge zone. An other alternative is that the edge zone 33 comprises a gradient wherein the printed electrically conducting layer 24 gradually transitions into the high permittivity layer 50 on the web 30. Such a gradient edge zone 33 may be formed by virtue of both the electrically conducting and the high permittivity layers 24 and 50 being printed. The printed material (e.g. ink) may then be mixed with different proportions of the electrically conducting material and the high permittivity material when printing the edge zone 33.

Figure 6:
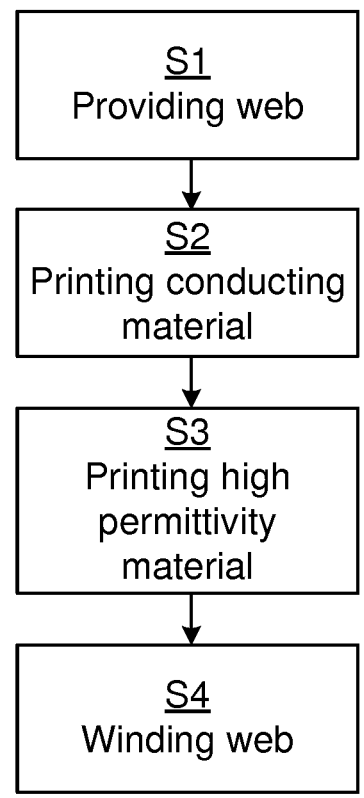
FIG. 6 is a schematic flow-chart of an embodiment of a method of producing a wound body for a wound electrical component, in accordance with the present invention.

FIG. 6 is a schematic flow-chart of an embodiment of a method of producing a wound body 2 for a wound electrical component 1. The method comprises providing S1 a web 30 of an electrically insulating material 21. The method also comprises printing S2 an electrically conducting material onto each of a plurality of separate areas 32 of the web to form a plurality of respective electrically conducting layers 24 covering each of said areas. The method also comprises, along at least one edge zone 33 of at least one of the plurality of electrically conducting layers 24, printing S3 a high permittivity material to form a high permittivity layer 50 connected with (i.e. in contact with) said edge zone such that at least a part 52 of the high permittivity layer extends, printed on the web 30, beyond the edge zone (i.e. not in contact with the edge zone). The method also comprises winding S4 the web 30 with the printed electrically conducting and high permittivity layers 24 and 50 to form the body 2 of wound layers of the web 30 around a longitudinal axis 4 of the body.

In some embodiments of the present invention, at least a part 51 of the high permittivity layer 50 overlaps the edge zone 33 of the electrically conducting layer 24, as in FIG. 5a. This may be a simple and convenient way of forming a high permittivity layer in contact with the edge zone of the electrically conducting layer.

In some other embodiments of the present invention, the high permittivity layer 50 abuts the edge zone 33 of the electrically conducting layer 24, such that the high permittivity layer is fully in the same plane (i.e. not overlapping) on the web 30 as the electrically conducting layer 24. In some embodiments, said edge zone 33 comprises a material gradient in which the electrically conducting material of the printed electrically conducting layer 24 gradually transitions into the high permittivity material of the high permittivity layer 50 on the web 30.

In some embodiments of the present invention, the high permittivity material has a relative permittivity which is at least twice as high as the relative permittivity of the electrically insulating material 21, e.g. at least three times as high and/or at most six times as high, for instance the high permittivity material can have a relative permittivity within the range of 5-20, preferably 8-12.

In some embodiments of the present invention, the high permittivity material has a permittivity which changes less than a factor 2, e.g. less than a factor 1.5 or a factor 1.2, when subjected to an electrical field within the range of 1-20 kV/mm. The permittivity of the high permittivity material will change with the electric field applied to it. The permittivity of the high permittivity material of the present invention may change only slightly with the electrical field, but should not change as much as for e.g. a non-linear capacitive FGM.

In some embodiments of the present invention, the high permittivity material has a resistivity of at least $10^9$ ohm-meter, or $10^{10}$ ohm-meter, or $10^{11}$ ohm-meter. Not only the permittivity, but also the resistivity, of the high permittivity material may be relevant to embodiments of the present invention.

In some embodiments of the present invention, each of the printed electrically conducting layers (24) and/or the printed high permittivity layer (50) has a thickness within the range of 0.1-12 µm, e.g. 0.2-11 µm, 0.5-10 µm or 1-5 µm. A low thickness may be obtained by printing (compared with using foils or films), and may be advantageous for taking up less space within the body 2.

In some embodiments of the present invention, the high permittivity material comprises particles, e.g. nano-particles. The particles may e.g. comprise titanium oxide ($TiO_2$), zinc oxide (ZnO), barium titanate ($BaTiO_3$), strontium titanate ($SrTiO_3$), or graphene oxide. The particles may be in combination with a binder, e.g. forming an ink.

In some embodiments of the present invention, the electrically conductive layers 24 have a sheet resistance within the range of 10Ω per square to 10Ω per square.

In some embodiments of the present invention, the component 1 comprises a bushing, e.g. a transformer bushing, a capacitor, a cable termination or an instrument transformer, preferably a HV transformer bushing.

In some embodiments of the present invention, the printing S2 of the electrically conducting layers 24 and/or the printing S3 of the high permittivity layer 50 is by means of inkjet printing, screen printing, intermittent web coating or slot die coating, preferably inkjet printing or screen printing, e.g. inkjet printing. However, any type of printing technique, or mix of printing techniques may be used as suitable.

In some embodiments of the present invention, the printing S2 of the electrically conducting layers 24 comprises using an electrically conductive ink, e.g. comprising electrically conducting particles of silver, copper, zinc and/or carbon, e.g. graphite and/or graphene or carbon black, with a binder in a solvent, whereby the solvent is evaporated and the particles are sintered or fused to form the electrically conducting layers 24.

Similarly, in some embodiments of the present invention, the printing S3 of the high permittivity layer 50 comprises using a high permittivity ink, including particles, e.g. nano-particles, in combination with binder in a solvent, whereby the solvent is evaporated to form the high permittivity layer. The particles may e.g. comprise or consist of titanium oxide, $TiO_2$; zinc oxide, ZnO; barium titanate, $BaTiO_3$; strontium titanate, $SrTiO_3$; or graphene oxide.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A wound electrical component comprising a wound body comprising a plurality of wound layers of a web of an electrically insulating material around a longitudinal axis of the body;

wherein the wound body comprises a plurality of electrically conducting layers of an electrically conducting material, each printed onto a respective separate area of the web in the wound body;

wherein an edge zone of at least one of the plurality of electrically conducting layers is connected to a printed high permittivity layer of a high permittivity material along said edge zone such that at least a part of the high permittivity layer extends, printed on the web, beyond the edge zone, wherein each of the plurality of electrically conducting layers is a electronically conducting printed layer that is devoid of foil.

2. The wound electrical component of claim 1, wherein at least a part of the high permittivity layer overlaps the edge zone of the electrically conducting layer.

3. The wound electrical component of claim 1, wherein said edge zone comprises a material gradient in which the electrically conducting material of the printed electrically conducting layer 24 gradually transitions into the high permittivity material of the high permittivity layer on the web.

4. The wound electrical component of claim 1, wherein the high permittivity material has a relative permittivity which is at least twice as high as the relative permittivity of the electrically insulating material.

5. The wound electrical component of claim 1, wherein the high permittivity material has a permittivity which changes less than a factor 2 when subjected to an electrical field within the range of 1-20 kV/mm.

6. The wound electrical component of claim 1, wherein the high permittivity material has a resistivity of at least one of $10^9$ ohm-meter or $10^{10}$ ohm-meter or $10^{11}$ ohm-meter.

7. The wound electrical component of claim 1, wherein each of the printed electrically conducting layers and/or the printed high permittivity layer has a thickness within a range of 0.1-12 μm.

8. The wound electrical component of claim 1, wherein the high permittivity material comprises nano-particles comprising titanium oxide, $TiO_2$; zinc oxide, ZnO; barium titanate, $BaTiO_3$; strontium titanate, $SrTiO_3$; or graphene oxide; in combination with a binder.

9. The wound electrical component of claim 1, wherein the electrically conductive layers have a sheet resistance within a range of 10 ohms per square to 10 000 ohms per square.

10. The wound electrical component of claim 1, wherein the component comprises a bushing comprising at least one of a transformer bushing, a capacitor, a cable termination, an instrument transformer, or a HV transformer bushing.

11. An electrical device comprising:
a wound electrical component including a wound body comprising a plurality of wound layers of a web of an electrically insulating material around a longitudinal axis of the body;
wherein the wound body comprises a plurality of electrically conducting layers of an electrically conducting material, each printed onto a respective separate area of the web in the wound body;
wherein an edge zone of at least one of the plurality of electrically conducting layers is connected to a printed high permittivity layer of a high permittivity material along said edge zone such that at least a part of the high permittivity layer extends, printed on the web, beyond the edge zone, wherein the electrical device is a power transformer, and wherein each of the plurality of electrically conducting layers is a electronically conducting printed layer that is devoid of foil.

12. A method of producing a wound body for a wound electrical component, the method comprising:
providing a web of an electrically insulating material;
printing an electrically conducting material onto each of a plurality of separate areas of the web to form a plurality of respective electrically conducting layers covering each of said areas;
along at least one edge zone of at least one of the plurality of electrically conducting layers, printing a high permittivity material to form a high permittivity layer connected with said edge zone such that at least a part of the high permittivity layer extends, printed on the web, beyond the edge zone, wherein each of the plurality of electrically conducting layers is a electronically conducting printed layer that is devoid of foil; and
winding the web with the printed electrically conducting and high permittivity layers to form the body of wound layers of the web around a longitudinal axis of the body.

13. The method of claim 12, wherein the printing of the electrically conducting layers and/or the printing of the high permittivity layer is by means of inkjet printing, screen printing, intermittent web coating or slot die coating.

14. The method of claim 12, wherein the printing of the electrically conducting layers comprises using an electrically conductive ink that comprises electrically conducting particles of silver, copper, zinc, graphite, graphene and/or carbon black, with a binder in a solvent, whereby the solvent is evaporated and the particles are sintered or fused to form the electrically conducting layers.

15. The method of claim 12, wherein the printing of the high permittivity layer comprises using a high permittivity ink, including particles comprising nano-particles comprising titanium oxide, $TiO_2$; zinc oxide, ZnO; barium titanate, $BaTiO_3$; strontium titanate, $SrTiO_3$; or graphene oxide; in combination with binder in a solvent, whereby the solvent is evaporated to form the high permittivity layer.

16. The method of claim 15 wherein the printing of the high permittivity layer comprises using a high permittivity ink having a permittivity which changes less than a factor 2 when subjected to an electrical field within the range of 1-20 kV/mm.

17. The method of claim 12, wherein printing the high permittivity material comprises printing a high permittivity material having a resistivity of at least one of $10^9$ ohm-meter or $10^{10}$ ohm-meter or $10^{11}$ ohm-meter.

18. The method of claim 12, wherein printing the electrically conducting material onto each of a plurality of separate areas comprises printing the electrically conducting material with a thickness within a range of 0.1-12 μm.

19. The method of claim 12, wherein printing the electrically conducting material onto each of a plurality of separate areas of the web to form the plurality of respective electrically conducting layers comprises wherein printing the electrically conducting material onto each of a plurality of separate areas of the web to form the plurality of respective electrically conducting layers each having a sheet resistance within a range of 10 ohms per square to 10 000 ohms per square.

* * * * *